US011952313B1

(12) United States Patent
Alhozaimy et al.

(10) Patent No.: US 11,952,313 B1
(45) Date of Patent: Apr. 9, 2024

(54) COUPLED BORATE/SILICATE SALTS-BASED ADDITIVES FOR MORTAR OR CONCRETE

(71) Applicant: KING SAUD UNIVERSITY, Riyadh (SA)

(72) Inventors: Abdulrahman Alhozaimy, Riyadh (SA); Raja Rizwan Hussain, Riyadh (SA); Abdulaziz Al-Negheimish, Riyadh (SA); Devendra Deo Narain Singh, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/195,928

(22) Filed: May 10, 2023

(51) Int. Cl.
*C04B 22/00* (2006.01)
*C04B 14/48* (2006.01)
*C04B 28/02* (2006.01)
*C04B 40/00* (2006.01)
*C04B 103/61* (2006.01)
*C04B 111/21* (2006.01)

(52) U.S. Cl.
CPC .......... *C04B 22/0013* (2013.01); *C04B 14/48* (2013.01); *C04B 28/02* (2013.01); *C04B 40/0046* (2013.01); *C04B 2103/61* (2013.01); *C04B 2111/21* (2013.01)

(58) Field of Classification Search
CPC ..... C04B 22/0013; C04B 14/48; C04B 28/02; C04B 40/0046; C04B 2103/61; C04B 2111/21
See application file for complete search history.

(56) References Cited

U.S. PATENT DOCUMENTS

| 3,180,746 | A | 4/1965 | Patton et al. |
| 4,452,635 | A | 6/1984 | Noshi et al. |
| 5,092,923 | A | 3/1992 | Dillard et al. |
| 5,427,819 | A | 6/1995 | Weyers et al. |
| 6,399,021 | B1 | 6/2002 | Heimann et al. |
| 6,783,799 | B1 | 8/2004 | Goodson |

FOREIGN PATENT DOCUMENTS

| CN | 106116535 | A | | 11/2016 | |
| CN | 106746892 | A | * | 5/2017 | ......... C04B 22/0013 |
| CN | 108059431 | A | * | 5/2018 | ............. C04B 28/14 |
| CN | 111875317 | A | * | 11/2020 | ............. C04B 28/04 |
| EP | 1780185 | A1 | * | 5/2007 | ............. C04B 28/04 |
| EP | 1618156 | B1 | | 11/2013 | |
| JP | 8104556 | A | | 4/1996 | |
| JP | 2002249351 | A | * | 9/2002 | ............. C04B 12/04 |
| KR | 20030074180 | A | | 9/2003 | |
| KR | 20110017950 | A | | 2/2011 | |

OTHER PUBLICATIONS

Bremner et al. "Protection of Metals in Concrete Against Corrosion," Technical Report for ACI Committee 222, Copyright 2001, American Concrete Institute: http://civilwares.free.fr/ACI/MCP04/222r_01.pdf.
Kwon et al., "Effect of Silicate Ions on Conversion of Ferric Hydroxide to Beta FeOOH and Alpha Fe2O3," Materials Transactions, vol. 46, No. 2 (2005) pp. 155 to 158 Copyright 2005 The Japan Institute of Metals.
Bolzoni et al., "Experiences on corrosion inhibitors for reinforced concrete," Int. J. Corros. Scale Inhib., 2014, 3, No. 4, 254-278.

* cited by examiner

*Primary Examiner* — Anthony J Green
(74) *Attorney, Agent, or Firm* — Nath, Goldberg & Meyer; Richard C. Litman

(57) ABSTRACT

The coupled borate/silicate salts-based additive for mortar or concrete controls chloride induced pitting and uniform corrosion of steel rebars embedded in the mortar or concrete with no detrimental effect on compressive strength of mortar/concrete. The silicate compounds may include one or more of the salts of sodium, potassium, lithium, calcium, magnesium, manganese, iron, zinc, aluminum and other transition and valve metals. The borate compounds may include one or more of the salts of alkali and alkaline earth metals, transition, non-transition and valve metals such as sodium, potassium, lithium, calcium, magnesium, manganese, iron, zinc, aluminum and others. The combination of the borate and silicate salts as an additive has been shown to impart high protection to steel rebar surfaces against corrosion, and particularly chloride induced pitting corrosion. The additives are equally effective for mortar as well as concrete. They are also eco-friendly, economical, and are easily applied at construction sites.

11 Claims, 4 Drawing Sheets

COUPLED BORATE/SILICATE SALTS-BASED ADDITIVES FOR MORTAR OR CONCRETE

BACKGROUND

1. Field

The disclosure of the present patent application relates to functional additives for mortar or concrete, and particularly to coupled borate/silicate salts-based additives for the control of chloride induced pitting and uniform corrosion of steel reinforcement bars embedded in mortar or concrete.

2. Description of the Related Art

In general, additives for mortar or concrete for reducing steel corrosion are known. While additives for mortar or concrete containing borate and silicate salts are known, the use of specific borate and silicate salts in relative amounts for the protection of steel rebars against chloride induced pitting and uniform corrosion has not been investigated. The existing additives for mortar or concrete containing only borate salts or only silicate salts provide a lesser protection to the steel rebars against chloride induced pitting and uniform corrosion.

Thus, coupled borate/silicate salts-based additives for mortar or concrete solving the aforementioned problems is desired.

SUMMARY

The coupled borate/silicate salts-based additive for mortar or concrete controls chloride induced pitting and uniform corrosion of steel rebars embedded in the mortar or concrete. The silicate compounds may include one or more of the salts of sodium, potassium, lithium, calcium, magnesium, manganese, iron, zinc, aluminum and other transition and valve metals. The borate compounds may include one or more of the salts of alkali and alkaline earth metals, transition, non-transition and valve metals such as sodium, potassium, lithium, calcium, magnesium, manganese, iron, zinc, aluminum and others. The combination of the above borate and silicate salts as an additive has been shown to impart high protection to the surface of steel rebars against corrosion, and particularly chloride induced pitting corrosion. In addition, the additives have no detrimental effect on the compressive strength of the resulting concrete, or on its chloride permeability resistance. The additive is equally effective for mortar as well as concrete. The additives are useful for corrosion protection of new steel reinforced concrete structures as well as for the repair of existing steel reinforced concrete structures. They are also eco-friendly, economical, and are easily applied at construction sites. While not intended to be limited by theory, it is believed that this high protection of steel rebars against corrosion may be attributed to the catalytic effect between the borate and silicate salts.

In this regard, in one embodiment, the present subject matter relates to a coupled borate/silicate salts-based additive for mortar or concrete, comprising: silicate compounds that include one or more salts selected from the group consisting of sodium, potassium, lithium, calcium, magnesium, manganese, iron, zinc and aluminum and other transition and valve metals; and borate compounds that include one or more salts selected from the group consisting of sodium, potassium, lithium, calcium, magnesium, manganese, iron, zinc, and aluminum.

In another embodiment, the present subject matter relates to a mortar with embedded steel reinforcement bars, the mortar comprising: a binder; a fine aggregate; and a coupled borate/silicate salts-based additive, the additive comprising: silicate compounds that include one or more salts selected from the group consisting of sodium, potassium, lithium, calcium, magnesium, manganese, iron, zinc and aluminum and other transition and valve metals; and borate compounds that include one or more salts selected from the group consisting of sodium, potassium, lithium, calcium, magnesium, manganese, iron, zinc, and aluminum; wherein steel reinforcement bars are embedded in the mortar. Further in this regard, the mortar can further comprise a coarse aggregate to form a concrete mixture with embedded steel reinforcement bars.

In a further embodiment, the present subject matter relates to a method of forming a mortar with embedded steel reinforcement bars, the method comprising the steps of: adding together a silicate compound and a borate compound to form a coupled borate/silicate salts-based additive; adding together water, a binder, a fine aggregate and the additive; thoroughly mixing the water, the binder, the fine aggregate and the additive to form a mortar mixture; and embedding the steel reinforcement bars with the mortar mixture.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
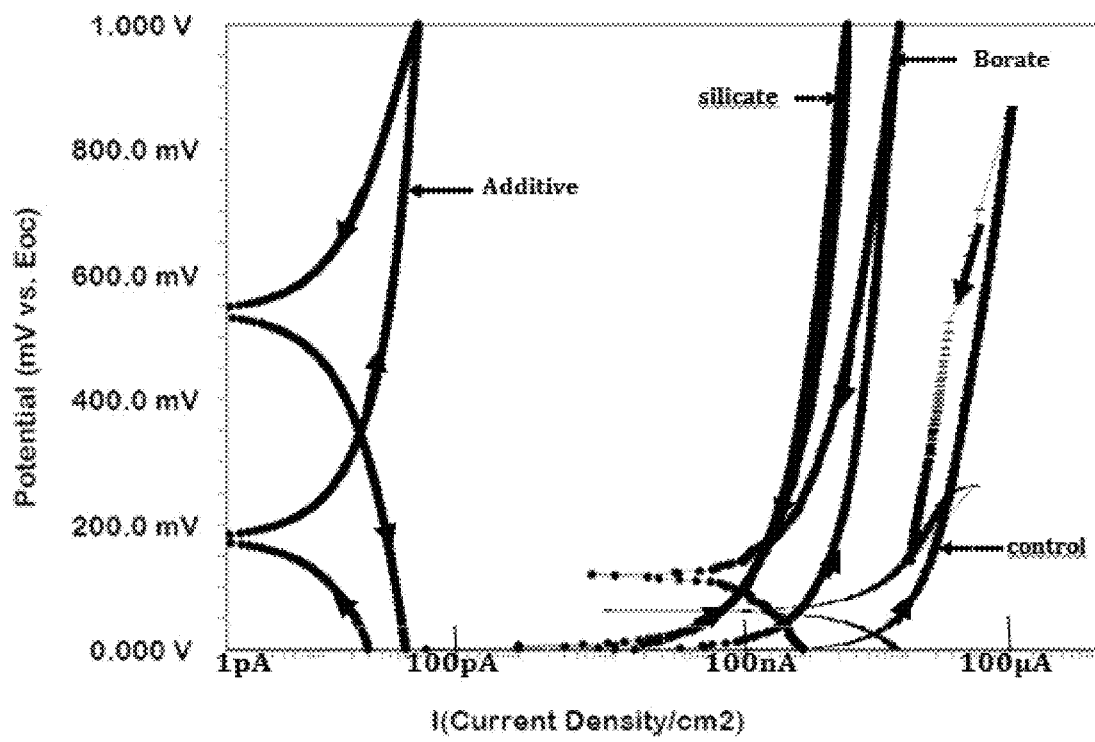
FIG. 1 is a graph showing cyclic polarization of rebars embedded in mortars without additive (control), with a 0.5% borate additive, a 0.5% silicate additive and with the coupled borate/silicate salts-based additive (0.5% borate+0.5% silicate), after 43 cycles of wet/dry treatment.

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

As used herein, the term "mortar" refers to a composition including cement or binder, a fine aggregate (usually fine sands) and lime. Mortar is generally used as an adhesive and filler when building with brick, block, and stone.

As used herein, the term "concrete" refers to a very strong structural building material including cement, sand, and coarse aggregate such as gravel and other materials.

The coupled borate/silicate salts-based additive for mortar or concrete controls chloride induced pitting and uniform corrosion of steel rebars embedded in the mortar or concrete. The silicate compounds may include one or more of the salts of sodium, potassium, lithium, calcium, magnesium, manganese, iron, zinc, aluminum and other transition and valve metals. The borate compounds may include one or more of the salts of alkali and alkaline earth metals, transition, non-transition and valve metals such as sodium, potassium, lithium, calcium, magnesium, manganese, iron, zinc, aluminum and others.

In one embodiment, the concentration range for the silicate compounds is from about 0.1% to about 5.0% with respect to the weight of the binder (cement) in the mortar. In another embodiment, the concentration range for the silicate compounds is from about 0.25% to about 2.5% with respect to the weight of the binder (cement) in the mortar. In a further embodiment, the concentration range for the silicate compounds is from about 0.3% to about 1.0% with respect to the weight of the binder (cement) in the mortar.

Similarly, in one embodiment, the concentration range for the borate compounds is from about 0.1% to about 5.0% with respect to the weight of the binder (cement) in the mortar. In another embodiment, the concentration range for the borate compounds is from about 0.25% to about 2.5% with respect to the weight of the binder (cement) in the mortar. In a further embodiment, the concentration range for the borate compounds is from about 0.3% to 1.0% with respect to the weight of binder.

In other embodiments, the ratio of silicate to borate in the additive is about 0.5:0.5 by weight. In another embodiment, the ratio of silicate to borate in the additive is about 0.5:0.4 by weight. In a further embodiment, the ratio of silicate to borate in the additive is about 0.5:0.25 by weight.

EXAMPLE

In the example, a sample of mortar with the coupled borate/silicate salts-based additives was prepared, as well as a sample of mortar with an additive with silicate salt only, a sample of mortar with an additive with borate salt only, and a set of mortar with no additives (control). The mortars were cast and tested under identical test conditions for comparison.

The steel rebars used to assess the efficacy of the developed additives were carbon-manganese steel rebars of 150 mm in length and 12 mm in diameter. They were descaled by abrading them on a motorized wheel fitted with sandpaper. The rebars were then cleaned with acetone before being embedded in the mortars.

The coupled borate/silicate salts-based additive used in the example included silicate salts of sodium, potassium, lithium, calcium, magnesium, iron, zinc, aluminum and similar other salts of compatible silicates were added in the mixture of mortar paste in a concentration range of about 0.1% to 1.0% of weight of binder used to cast the mortar. The borate salts of sodium, potassium, lithium, calcium, magnesium, iron, zinc, aluminum and similar other salts of compatible borates were added in the mixture of mortar paste in a concentration range of about 0.1% to about 1.0% of weight of binder used to cast the mortar. These salts were added together and mixed thoroughly. This mixture was then added to the mortar described below, at the time of the mixing the mortar.

The samples with only silicate additives included silicate salts in a concentration of about 0.5% of weight of binder. The samples with only borate additives included borate salts in a concentration of about 0.5% of weight of binder. The control sample mortar had no additives. The base mortar for all samples had a binder to water to sand ratio of 1:0.5:2.

After curing the samples for 28 days following standard procedures, they were subjected to wet/dry treatments. In one cycle of the wet/dry treatments, the mortars were kept wet in a 0.6M chloride solution for 10 days followed by drying in a laboratory environment for 15 days. These wet/dry treatments were done for 43 cycles. Such wet/dry treatments of mortars embedded with steel rebars augment the migration of moisture, gases and chloride ions through them and therefore accelerate the onset and propagation of corrosion reactions at the surface of the embedded rebars.

The polarization resistance of the rebars embedded in the treated sample mortars were measured by electrochemical impedance spectroscopy (EIS). In this technique, a sinusoidal voltage of 10 mV was imposed at the corroding interface at their corrosion potentials. The frequencies of the sinusoidal voltage were varied between 0.001 Hz and 100 KHz. The resulting impedance and shift in phase with changes in frequencies were monitored using a potentiostat. For determination of polarization resistance and other impedance parameters of the corroding surfaces in the samples, a constant phase element (CPE) model was used to extract data from the resistance which is inversely related to the corrosion current density (Icorr) with the following Stern-Geary equation:

$$Icorr = B/Rp \quad \text{(equation 1)}$$

where B is a constant and $R_p$ is polarization resistance (measured in $\Omega \cdot cm^2$).

The above equation shows that the corrosion current density and hence corrosion rate of a corroding metal-electrolyte interface has an inverse relationship with $R_p$ FIG. 1 is a graph comparing the anodic cyclic polarization of rebars in the sample mortars without additive (control), with 0.5% borate additive, with 0.5% silicate additive, and with the coupled borate/silicate salts-based additive, after 43 cycles of wet/dry treatment. As can be seen from the graph, the anodic cyclic polarization of the rebars in the sample mortar with coupled borate/silicate salts-based additive is shifted considerably lower in current density than the control sample as well as the borate only and silicate only samples. This indicates that the coupled borate/silicate salts-based additive imparts very significant protection against pitting and uniform corrosion of the rebars.

Figure 2A:
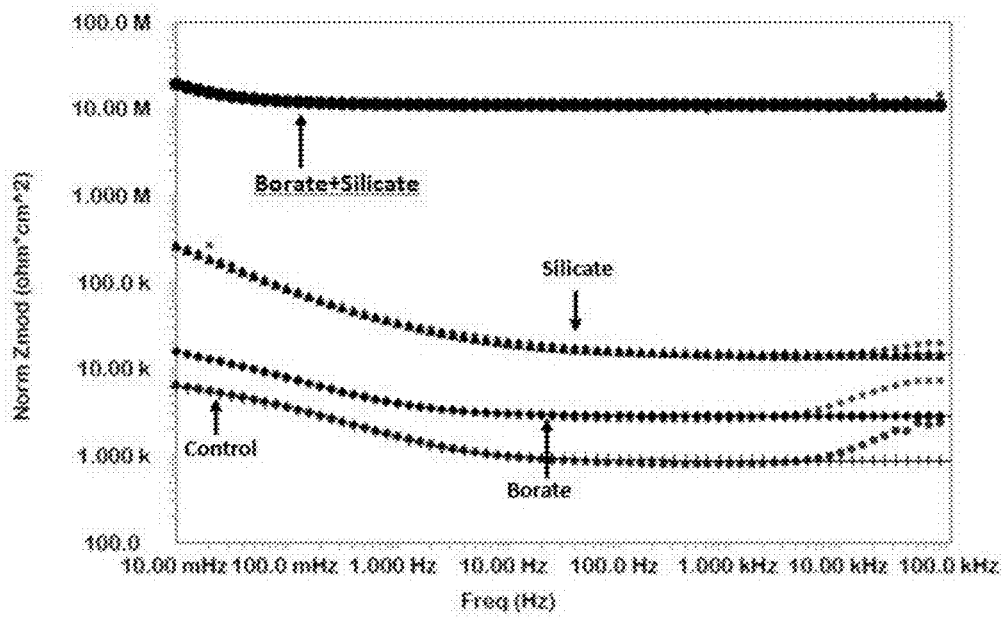
FIG. 2A is a frequency vs impedance plot for rebars embedded in mortars blended without additive, with a borate additive, a silicate additive and with the coupled borate/silicate salts-based additive, after 43 cycles of wet/dry treatments.
Figure 2B:
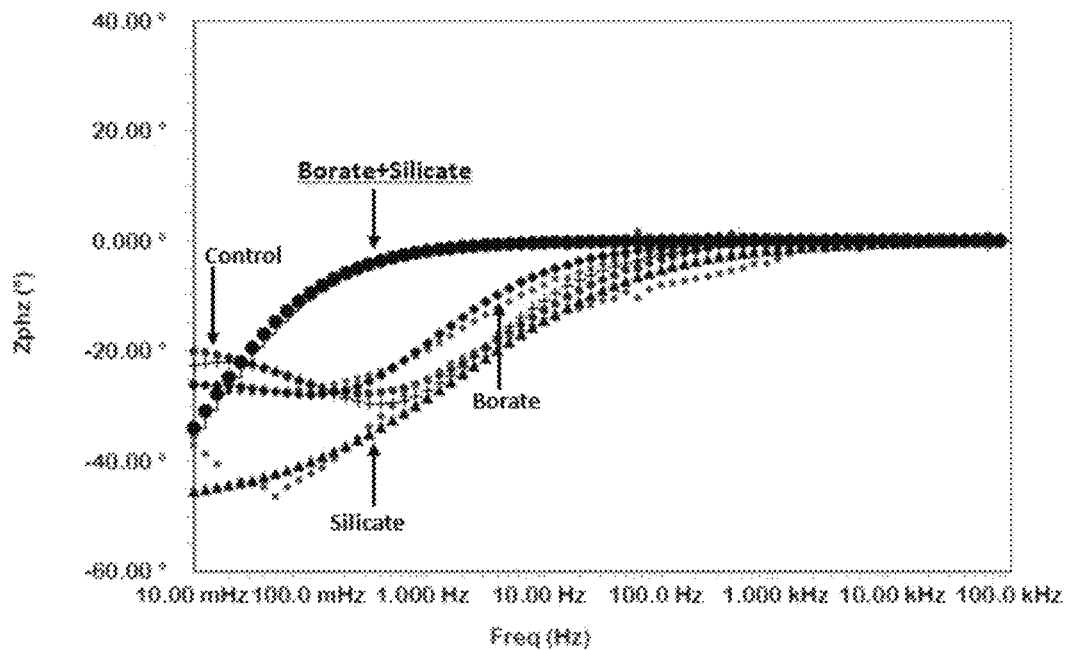
FIG. 2B is a frequency vs phase shift plot for rebars embedded in mortars blended without additive, with a borate additive, a silicate additive and with the coupled borate/silicate salts-based additive, after 43 cycles of wet/dry treatments.

FIG. 2A is a frequency vs impedance plot for rebars embedded in mortars blended without additive, with a borate additive, a silicate additive and with the coupled borate/silicate salts-based additive, after 43 cycles of wet/dry treatments. FIG. 2B is a frequency vs phase shift plot for rebars embedded in mortars blended without additive, with a borate additive, a silicate additive and with the coupled borate/silicate salts-based additive, after 43 cycles of wet/dry treatments. The corrosion parameters extracted from the plots using a best fit method using a constant phase element model are summarized in Table 1, below.

TABLE 1

Electrochemical parameters of the rebars in the sample mortars after 43 cycles of wet/dry treatment determined by electrochemical impedance spectroscopic method

| Samples ID | $R_p$ (KOhm · $cm^2$) | $Y_0$ (S · $s^a/cm^2$) | A α | $W_d$ (S · $s^{(1/2)}/cm^2$) |
|---|---|---|---|---|
| Control | 4.282 | 254.3 ×$10^{-6}$ | 0.694 | 1405 × $10^{-6}$ |
| Borate | 12.50 | 174.5 × $10^{-6}$ | 0.809 | 496.6 × $10^{-6}$ |
| Silicate | 90.70 | 14.84 × $10^{-6}$ | 0.564 | 2.837 × $10^{-6}$ |
| Coupled Borate/Silicate | 346.8 × $10^3$ | 0.465 × $10^{-6}$ | 0.548 | 12.56 × $10^{-12}$ |

$R_p$ (polarization resistance) which is inversely proportional to corrosion rate as described in equation 1 above is significantly higher in the rebars of the coupled borate/silicate mortar sample than the rebars of the control mortar and the borate only and silicate only mortars, indicating that the rebars of the coupled borate/silicate mortar sample had a reduced corrosion rate. In addition, $Y_0$ (the factor incorporating double layer capacitance) and Wd. (the components for diffusion of oxygen and ionic species through the passive layer) also confirm that the coupled borate/silicate additive had significantly reduced the corrosion rate.

Figure 3A:
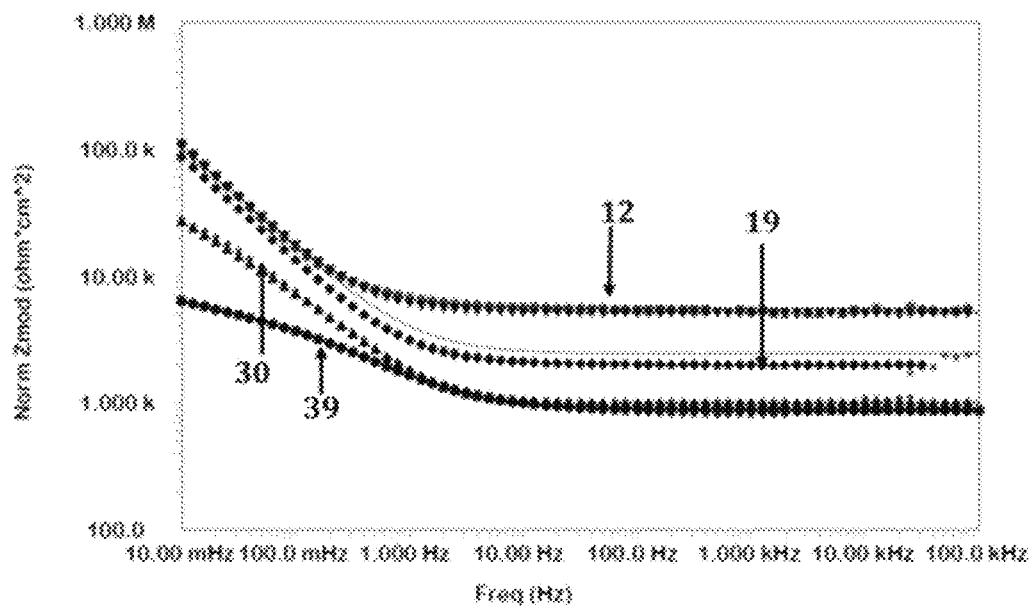
FIG. 3A is a frequency vs impedance plot for the rebars in the control sample mortar, after 12, 19, 30 and 39 cycles of wet/dry treatments.
Figure 3B:
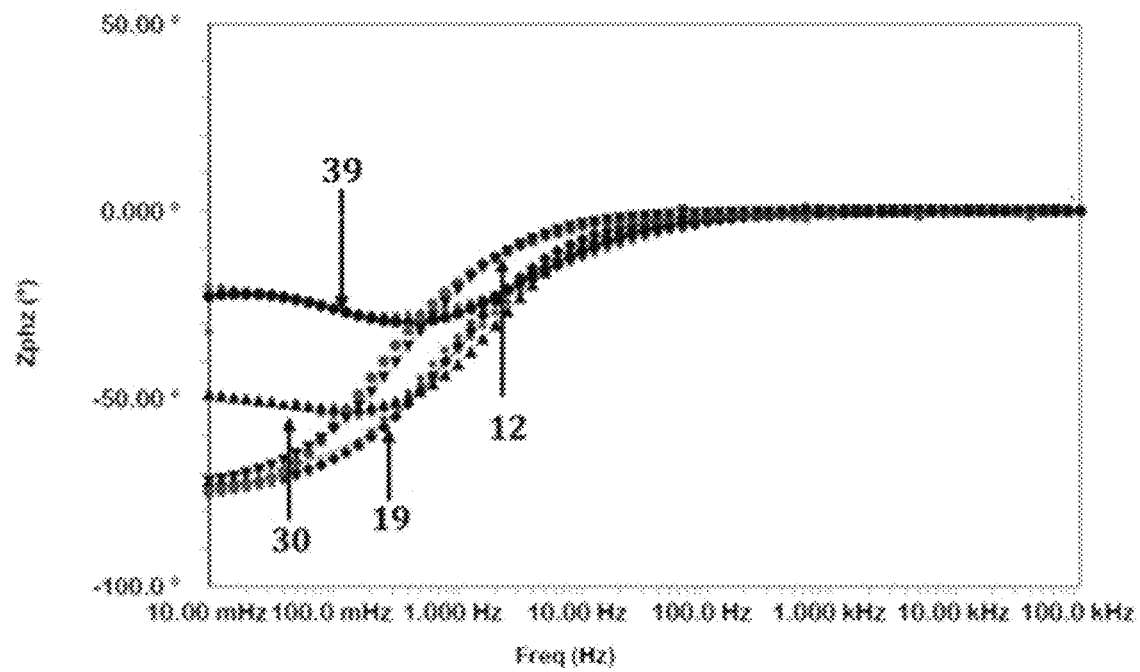
FIG. 3B is a frequency vs phase shift plot for the rebars in the control sample mortar, after 12, 19, 30 and 39 cycles of wet/dry treatments.
Figure 4A:
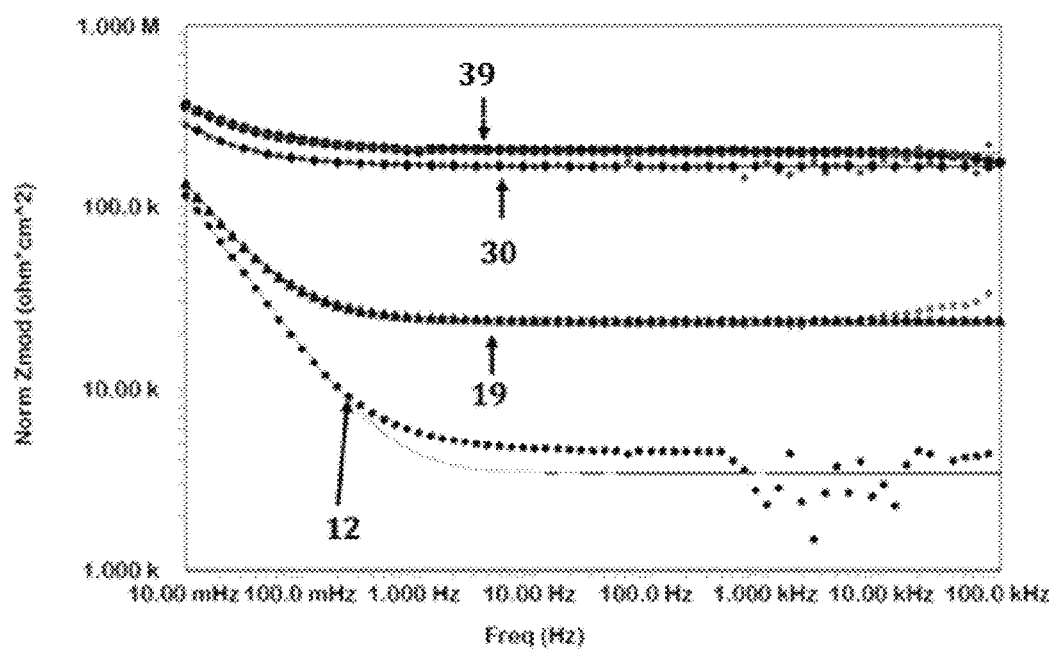
FIG. 4A is a frequency-log modulus impedance plot for the rebars in the sample mortar with the coupled borate/silicate salts-based additive, after 12, 19, 30 and 39 cycles of wet/dry treatments.
Figure 4B:
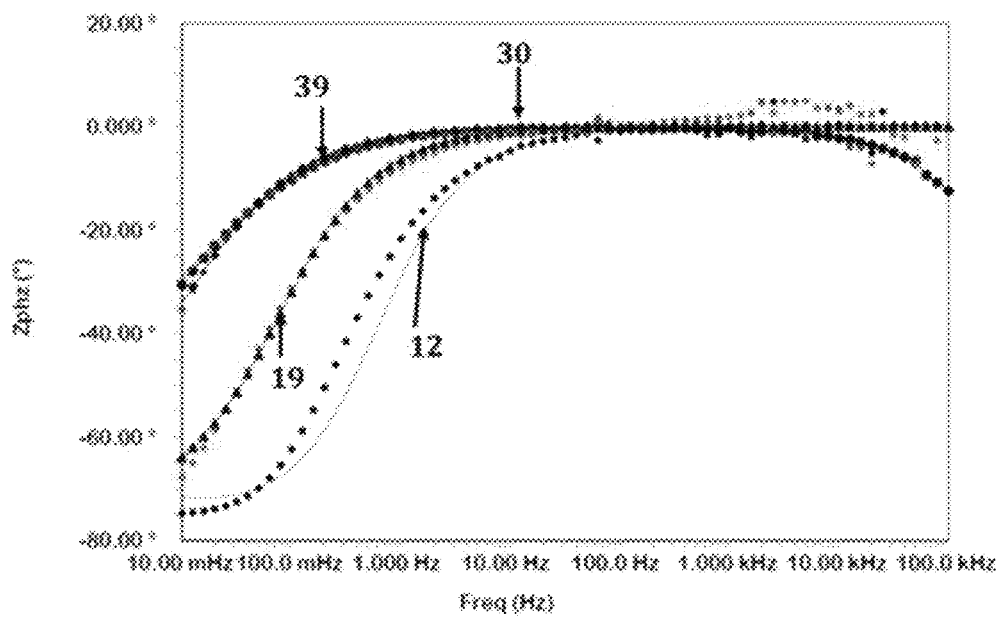
FIG. 4B is a frequency vs phase shift plot for the rebars in the sample mortar with the coupled borate/silicate salts-based additive, after 12, 19, 30 and 39 cycles of wet/dry treatments.

FIG. 3A is a frequency vs impedance plot for the rebars in the control sample mortar, after 12, 19, 30 and 39 cycles of wet/dry treatments. FIG. 3B is a frequency vs phase shift plot for the rebars in the control sample mortar, after 12, 19, 30 and 39 cycles of wet/dry treatments. FIG. 4A is a frequency-log modulus impedance plot for the rebars in the sample mortar with the coupled borate/silicate salts-based additive, after 12, 19, 30 and 39 cycles of wet/dry treatments. FIG. 4B is a frequency vs phase shift plot for the rebars in the sample mortar with the coupled borate/silicate salts-based additive, after 12, 19, 30 and 39 cycles of wet/dry treatments. The extracted results from the impedance plots of FIGS. 3A and 4A, using a constant phase element mode, as described above, are shown in Table 2, below.

TABLE 2

Variation of electrochemical parameters of corrosion for rebars embedded in the control sample mortar and for rebars embedded in the coupled borate/silicate mortar at different intervals of wet/dry treatments.

| Number of Wet/Dry Treatment Cycles | Control | | | | Coupled Borate/Silicate | | | |
|---|---|---|---|---|---|---|---|---|
| | $R_p$ (KOhm·cm²) | $Y_0$ (S·sª/cm²) | A | $W_d$ (S·s$^{(1/2)}$/CM²) | $R_p$ (KOhm·cm²) | $Y_0$ (S.sª/cm2) | α | $W_d$ (S·s$^{(1/2)}$/CM²) |
| 12 | 27.79 | 92.5 × 10⁻⁶ | 0.899 | 8.127 × 10⁻⁶ | 29.66 | 89.7 × 10⁻⁶ | 0.799 | 9.2 × 10⁻¹² |
| 19 | 11.01 | 115 × 10⁻⁶ | 0.827 | 4.041 × 10⁻⁵ | 42.56 | 25.9 × 10⁻⁶ | 0.624 | 8.2 × 10⁻¹² |
| 30 | 6.53 | 253 × 10⁻⁶ | 0.800 | 2.316 × 10⁻³ | 748.6 | 10.2 × 10⁻⁶ | 0.819 | 9.1 × 10⁻¹² |
| 39 | 5.33 | 287 × 10⁻⁶ | 0.644 | 1.812 × 10⁻³ | 1120.3 | 4.0 × 10⁻⁶ | 0.73 | 8.9 × 10⁻¹² |

The data indicate that during the initial period of exposure (12 cycles of wet/dry treatments) the corrosion parameters of the rebars embedded in the coupled borate/silicate mortar are closer to corrosion parameters of the rebars embedded in the control sample mortar. With increasing durations of exposure, however, the parameters for the rebars embedded in the control sample mortar had drastically deteriorated, indicating that enough chloride had reached the rebar/mortar interface causing degradation of the passive film. The data for the rebars embedded in the coupled borate/silicate mortar, on the other hand, are appreciably improved, thereby indicating strengthening of the passive film and minimal effect of the chloride on the passive film.

After the 43 cycles of wet/dry treatments, the mortars were broken and samples of mortar adjacent to the rebars' surface were chemically analyzed by energy dispersive X-ray analysis (EDXA). The results are shown in Table 3, below.

TABLE 3

EDXA of solid pieces of mortar collected from the close surface of embedded rebars after 43 cycles of wet/dry treatments in brine solution.

| | % of Elements | | | | | | |
|---|---|---|---|---|---|---|---|
| Samples ID | Cl | S | O | Ca | Si | Fe | Al |
| Control | 0.68 | 0.17 | 58.9 | 25.3 | 7.6 | 5.4 | 1.5 |
| Borate | 0.62 | 0.85 | 51.5 | 34.5 | 6.8 | 1.9 | 1.7 |
| Silicate | 0.63 | 0.67 | 54.5 | 11.3 | 28.5 | 1.4 | 1.3 |
| Coupled Borate/Silicate | 0.39 | 0.39 | 55.1 | 32.5 | 6.12 | 1.4 | 2.1 |

The results shown in Table 3 indicate that the coupled borate/silicate salts-based additive has no adverse effect, but rather controls the diffusion of chloride by more than 40% through the mortars versus the control mortar.

Further, as can be seen from Table 4, below, the compressive strength of the mortar/concrete is not adversely affected by the addition of the coupled borate/silicate salts-based additive.

TABLE 4

Compressive Strength of Mortar Cubes after 28 Days of Curing.

| Composition | Cube Strength (MPa) |
|---|---|
| Control Sample Mortar | 49.5 |
| Coupled Borate/Silicate Salts-Based Additive Sample Mortar | 59.8 |

Figures 5A, 5B, 5C, 5D:
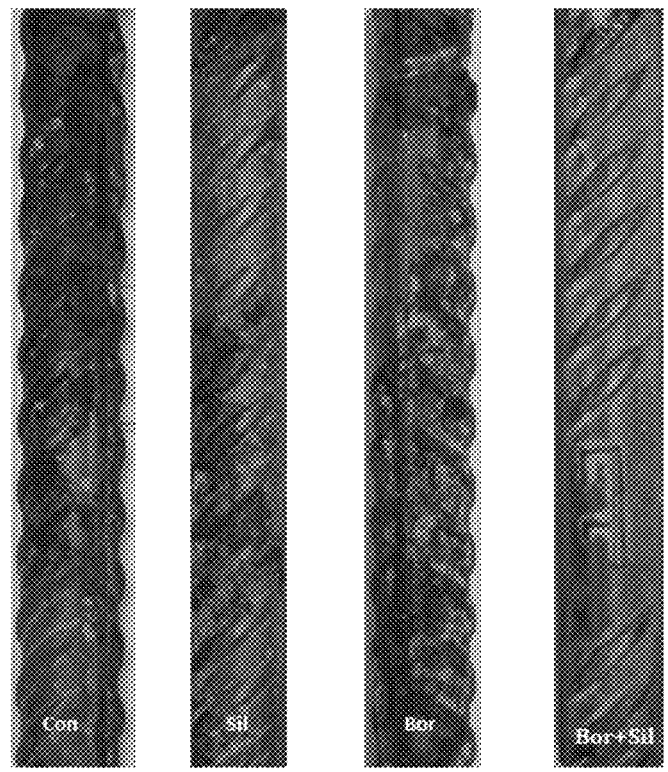
FIG. 5A is a photograph of a rebar sample embedded in mortar without additive (control), after 43 cycles of wet/dry treatments.
FIG. 5B is a photograph of a rebar sample embedded in mortar with a silicate additive, after 43 cycles of wet/dry treatments.
FIG. 5C is a photograph of a rebar sample embedded in mortar with a borate additive, after 43 cycles of wet/dry treatments.
FIG. 5D is a photograph of a rebar sample embedded in mortar with the coupled borate/silicate salts-based additive, after 43 cycles of wet/dry treatments.

After 43 cycles of wet/dry treatment the rebars were removed after breaking apart the sample mortars and photographed. FIG. 5A is a photograph of the rebar sample embedded in mortar without additive (control). FIG. 5B is a photograph of the rebar sample embedded in mortar with only a silicate additive. FIG. 5C is a photograph of the rebar sample embedded in mortar with only a borate additive. FIG. 5D is a photograph of the rebar sample embedded in mortar with the coupled borate/silicate salts-based additive. The photographs presented in FIGS. 5A-C show that the surface of the rebars embedded in control mortar and in the silicate and borate added mortars experienced severe pitting. Under the identical test, however, the rebar embedded in the coupled borate/silicate salts-based additive added mortar did not show any trace of rust or pits on their surface.

It is to be understood that the coupled borate/silicate salts-based additives for mortar or concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A mortar with embedded steel reinforcement bars, the mortar comprising:
   a binder;
   a fine aggregate; and
   a coupled borate/silicate salts-based additive, the additive comprising:
      silicate compounds that include one or more salts selected from the group consisting of sodium, potassium, lithium, calcium, magnesium, manganese, iron, zinc and aluminum; and
      borate compounds that include one or more salts selected from the group consisting of sodium, potassium, lithium, calcium, magnesium, manganese, iron, zinc, and aluminum;
   wherein steel reinforcement bars are embedded in the mortar; and wherein:
      a concentration range of the silicate compounds is from about 0.1% to about 5.0%, with respect to the weight of the binder in the mortar; and
      a concentration range for the borate compounds is from about 0.1% to about 5.0%, with respect to the weight of binder.

2. The mortar with embedded steel reinforcement bars as recited in claim 1, wherein:

the concentration range of the silicate compounds is from about 0.25% to about 2.5%, with respect to the weight of the binder in the mortar; and the concentration range for the borate compounds is from about 0.25% to about 2.5%, with respect to the weight of binder.

3. The mortar with embedded steel reinforcement bars as recited in claim 2, wherein:

the concentration range of the silicate compounds is from about 0.3% to about 1.0%, with respect to the weight of the binder in the mortar; and the concentration range for the borate compounds is from about 0.3% to about 1.0%, with respect to the weight of binder.

4. The mortar with embedded steel reinforcement bars as recited in claim 1, further comprising a coarse aggregate to form a concrete mixture with embedded steel reinforcement bars.

5. A method of forming a mortar with embedded steel reinforcement bars, the method comprising the steps of:

adding together a silicate compound and a borate compound to form a coupled borate/silicate salts-based additive;

adding together water, a binder, a fine aggregate and the additive;

thoroughly mixing the water, the binder, the fine aggregate and the additive to form a mortar mixture; and embedding the steel reinforcement bars with the mortar mixture;

wherein:

a concentration range of the silicate compounds is from about 0.1% to about 5.0%, with respect to the weight of the binder in the mortar; and a concentration range for the borate compounds is from about 0.1% to about 5.0%, with respect to the weight of binder.

6. The method of forming a mortar with embedded steel reinforcement bars as recited in claim 5, wherein:

the silicate compound includes one or more salts selected from the group consisting of sodium, potassium, lithium, calcium, magnesium, manganese, iron, zinc and aluminum; and the borate compound includes one or more salts selected from the group consisting of sodium, potassium, lithium, calcium, magnesium, manganese, iron, zinc, and aluminum.

7. The method of forming a mortar with embedded steel reinforcement bars as recited in claim 6, wherein a weight ratio of silicate compound to borate compound in the additive is about 0.5:0.5.

8. The method of forming a mortar with embedded steel reinforcement bars as recited in claim 6, wherein a weight ratio of silicate compound to borate compound in the additive is about 0.5:0.4.

9. The method of forming a mortar with embedded steel reinforcement bars as recited in claim 6, wherein a weight ratio of silicate compound to borate compound in the additive is about 0.5:0.25.

10. The method of forming a mortar with embedded steel reinforcement bars as recited in claim 6, wherein:

the concentration range of the silicate compounds is from about 0.25% to about 2.5%, with respect to the weight of the binder in the mortar; and the concentration range for the borate compounds is from about 0.25% to about 2.5%, with respect to the weight of binder.

11. The method of forming a mortar with embedded steel reinforcement bars as recited in claim 5, wherein:

the step of adding together water, a binder, a fine aggregate and the additive further includes adding a coarse aggregate;

the step of thoroughly mixing the water, the binder, the fine aggregate and the additive to form a mortar mixture further includes mixing the water, the binder, the fine aggregate, the additive and the coarse aggregate to form a concrete mixture; and embedding the steel reinforcement bars with the concrete mixture.

* * * * *